Sept. 12, 1950     T. J. BUTLER     2,521,776
GOLF PRACTICE APPARATUS
Filed Oct. 16, 1946     8 Sheets-Sheet 1
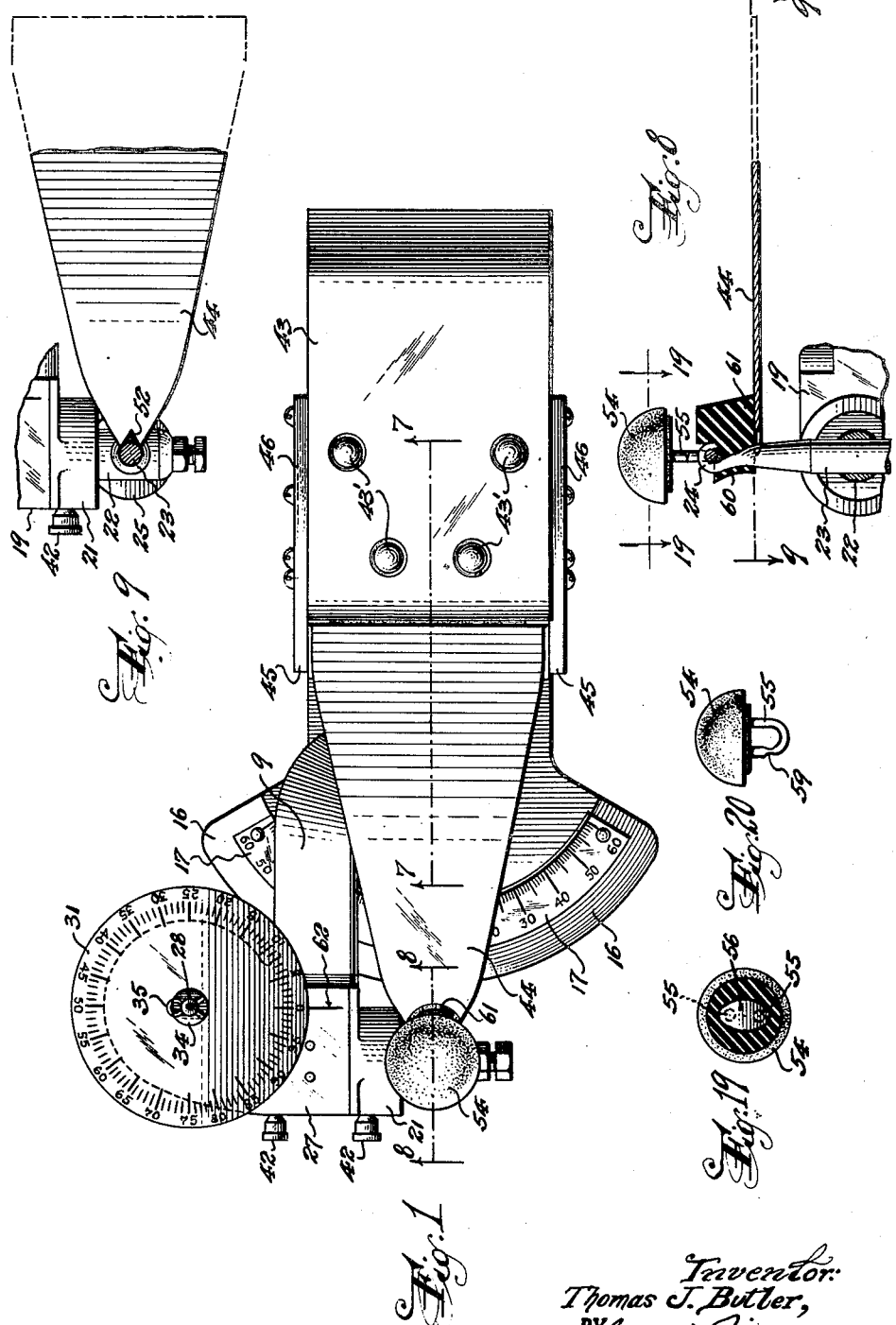
Inventor:
Thomas J. Butler,
BY George D. Richards
Attorney

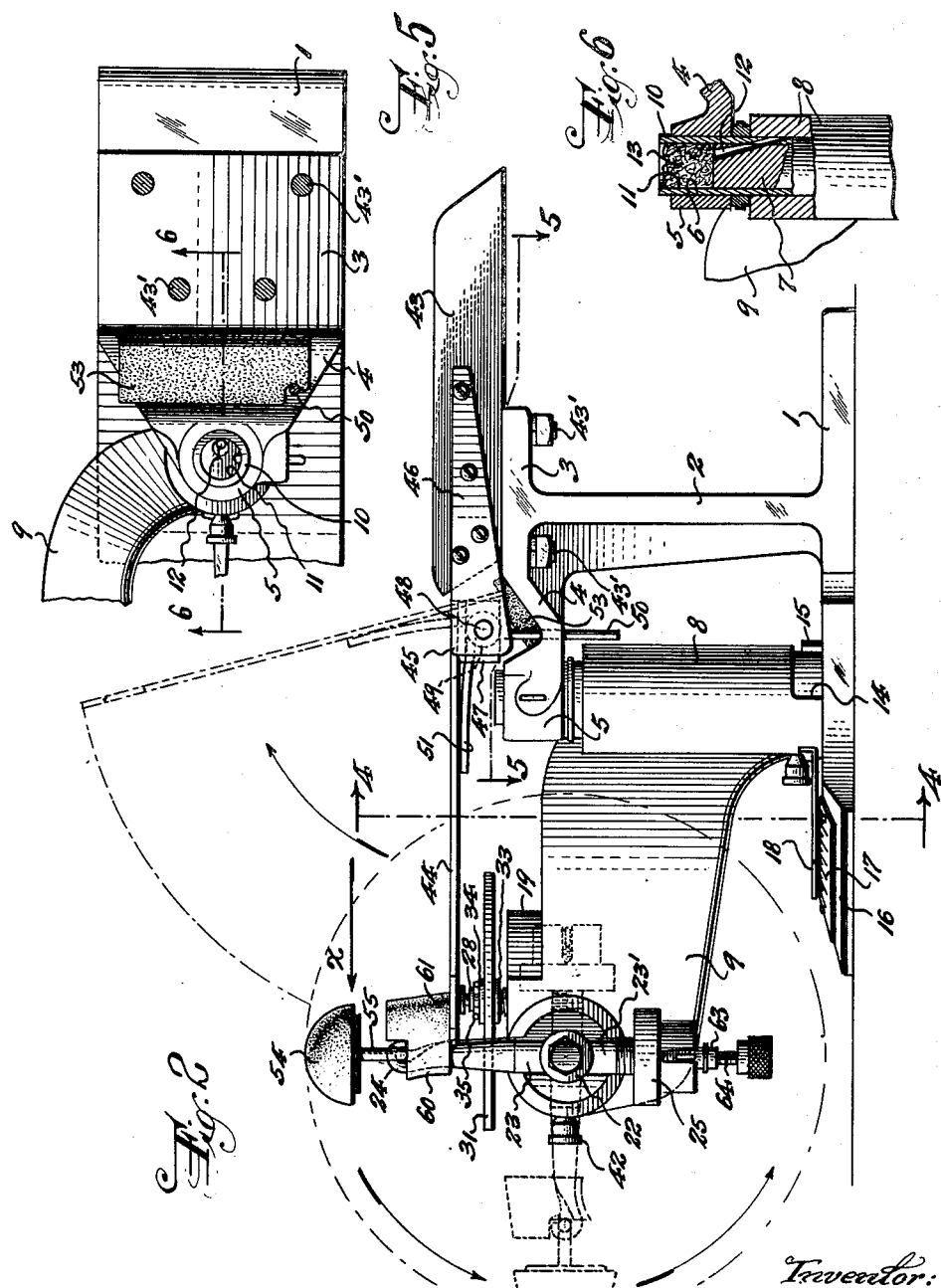

Sept. 12, 1950 T. J. BUTLER 2,521,776
GOLF PRACTICE APPARATUS
Filed Oct. 16, 1946 8 Sheets-Sheet 3
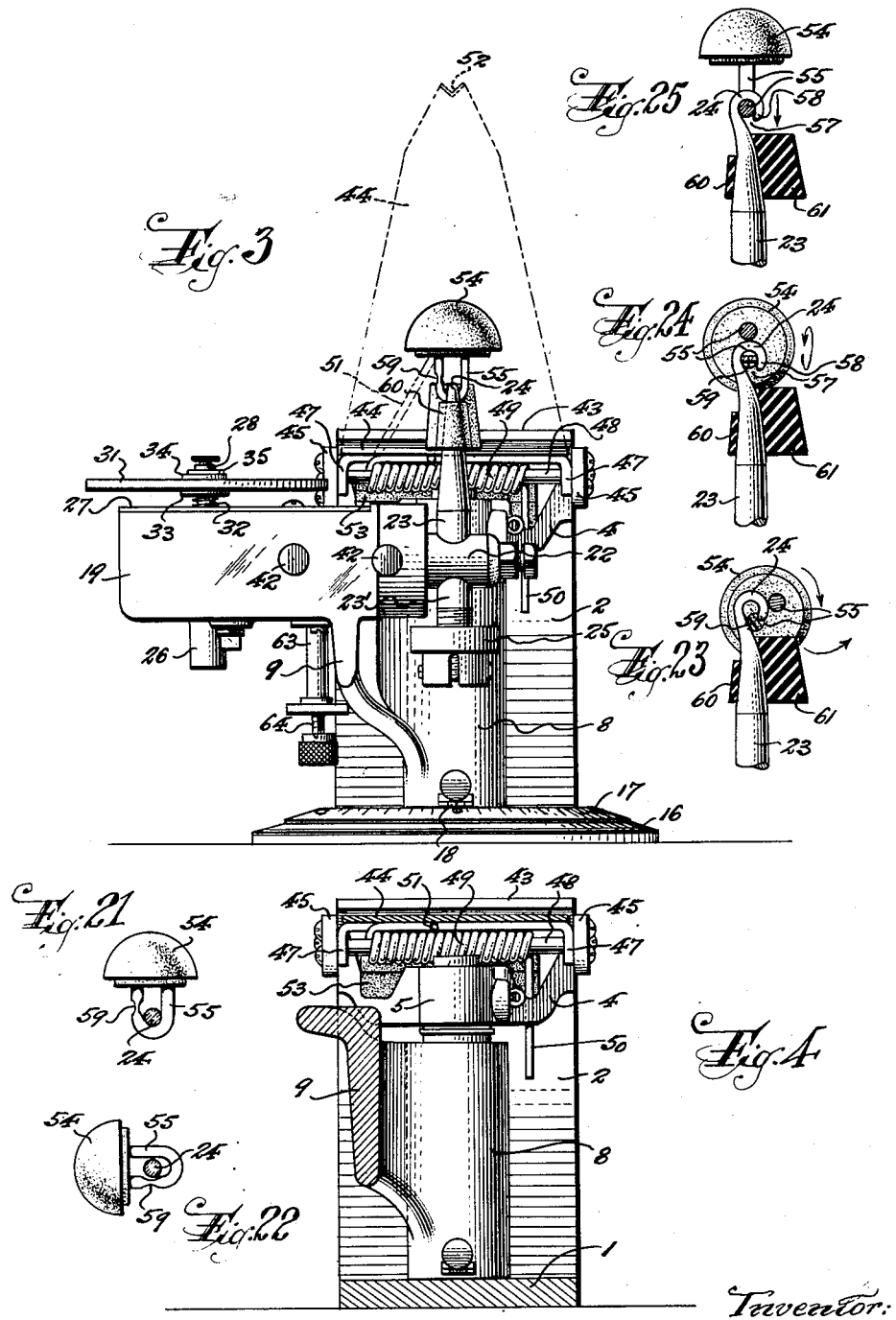
Inventor:
Thomas J. Butler,
BY George D. Richards,
Attorney.

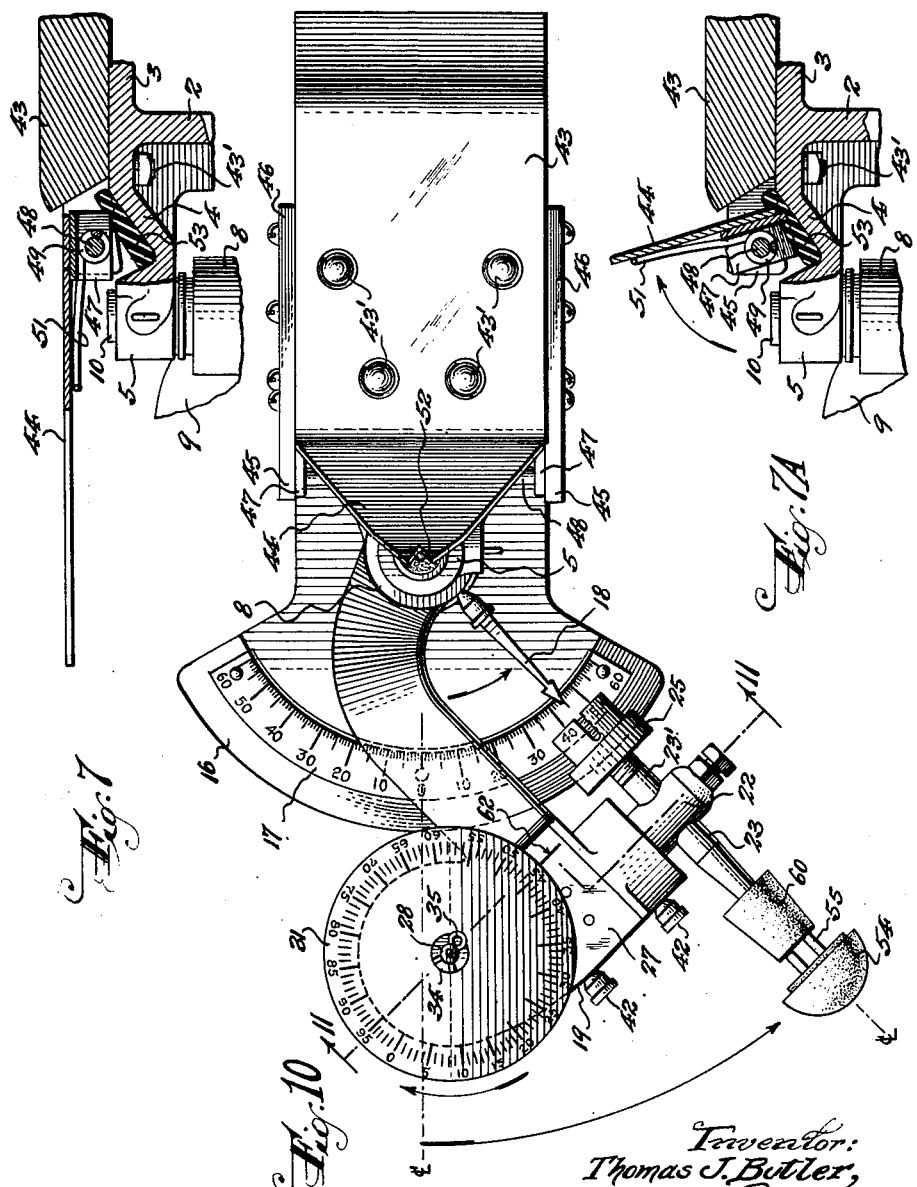

Sept. 12, 1950     T. J. BUTLER     2,521,776
GOLF PRACTICE APPARATUS
Filed Oct. 16, 1946                            8 Sheets-Sheet 5
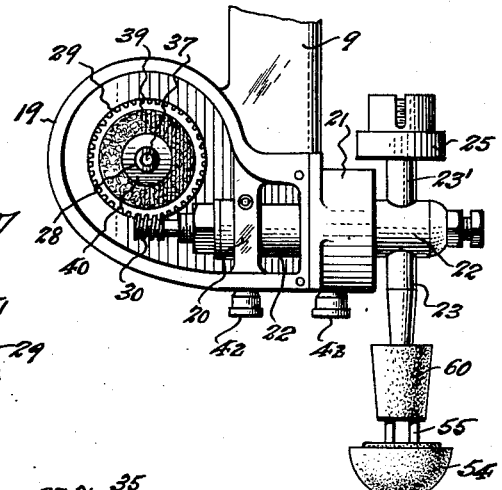
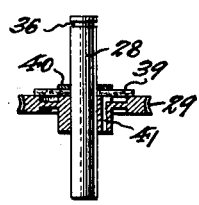
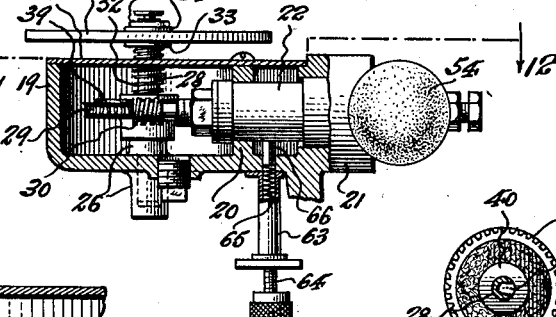
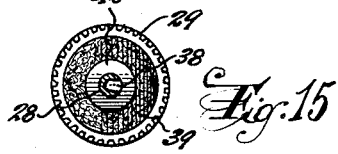
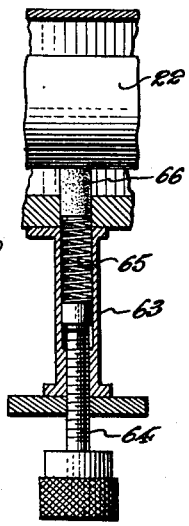
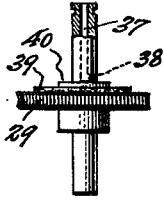
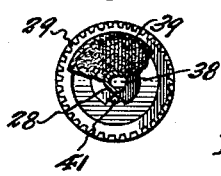
Inventor:
Thomas J. Butler,
BY George D. Richards,
Attorney.

Sept. 12, 1950  T. J. BUTLER  2,521,776
GOLF PRACTICE APPARATUS
Filed Oct. 16, 1946  8 Sheets-Sheet 6
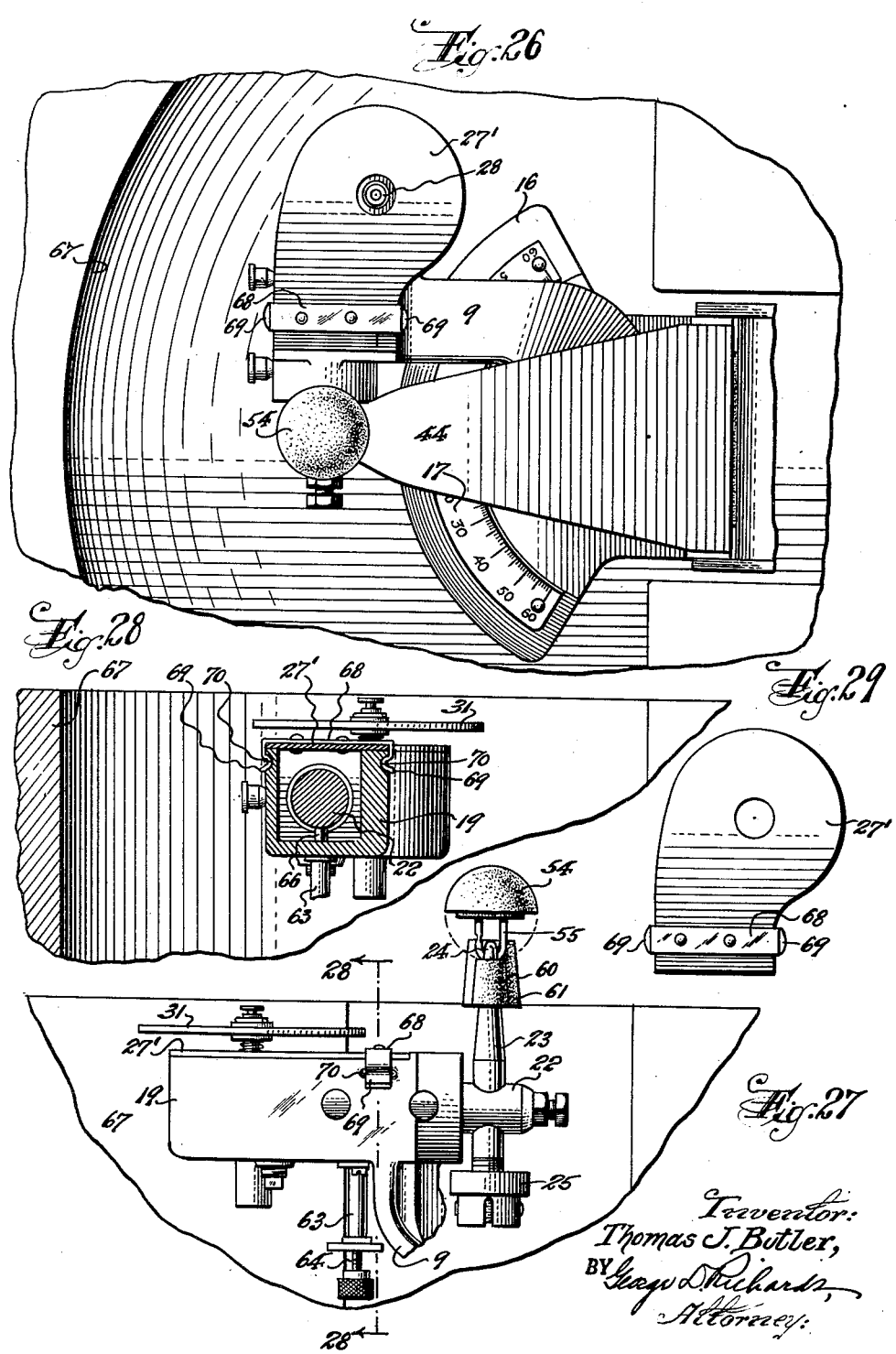

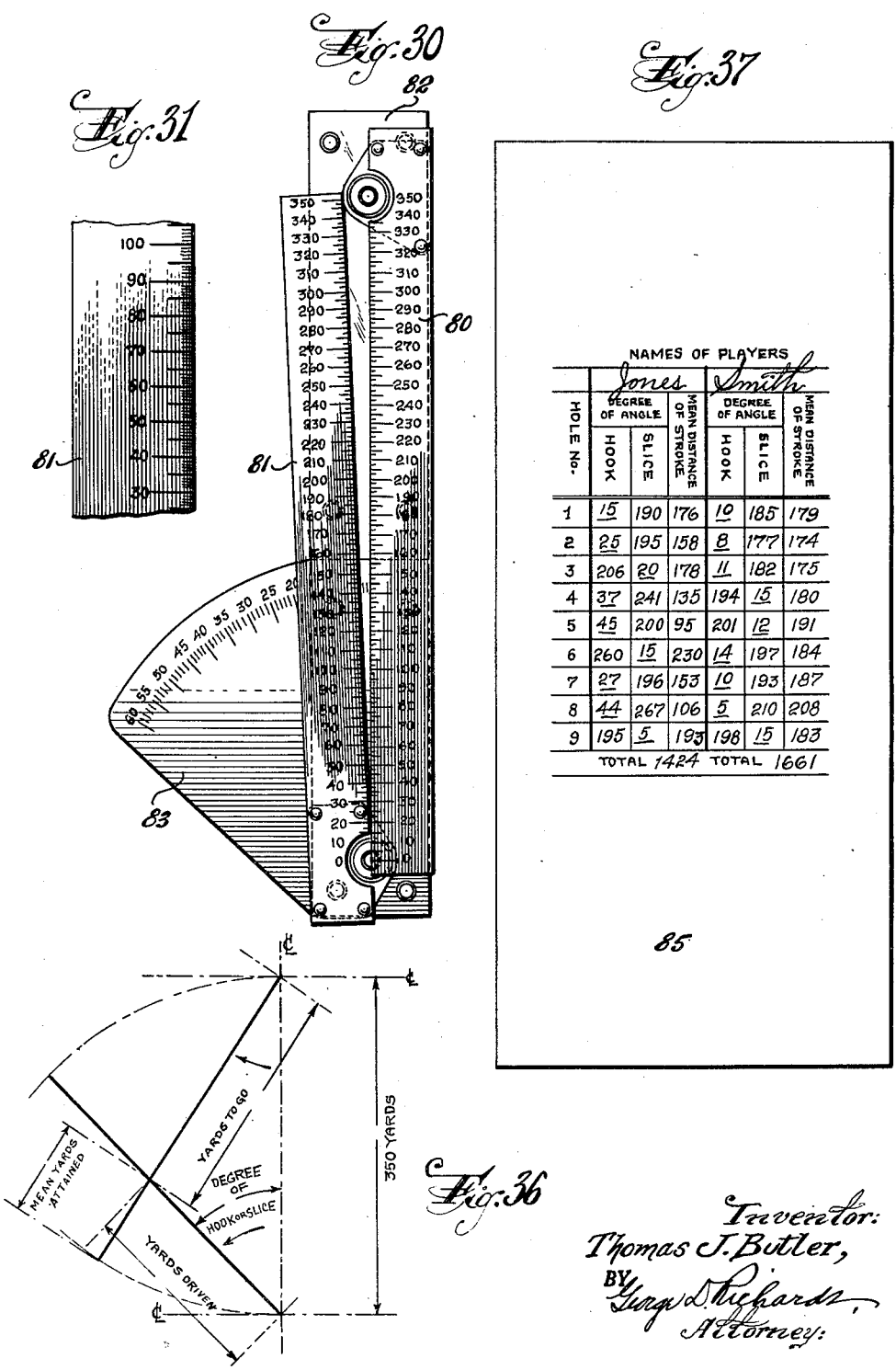

Sept. 12, 1950         T. J. BUTLER         2,521,776
GOLF PRACTICE APPARATUS
Filed Oct. 16, 1946         8 Sheets-Sheet 8
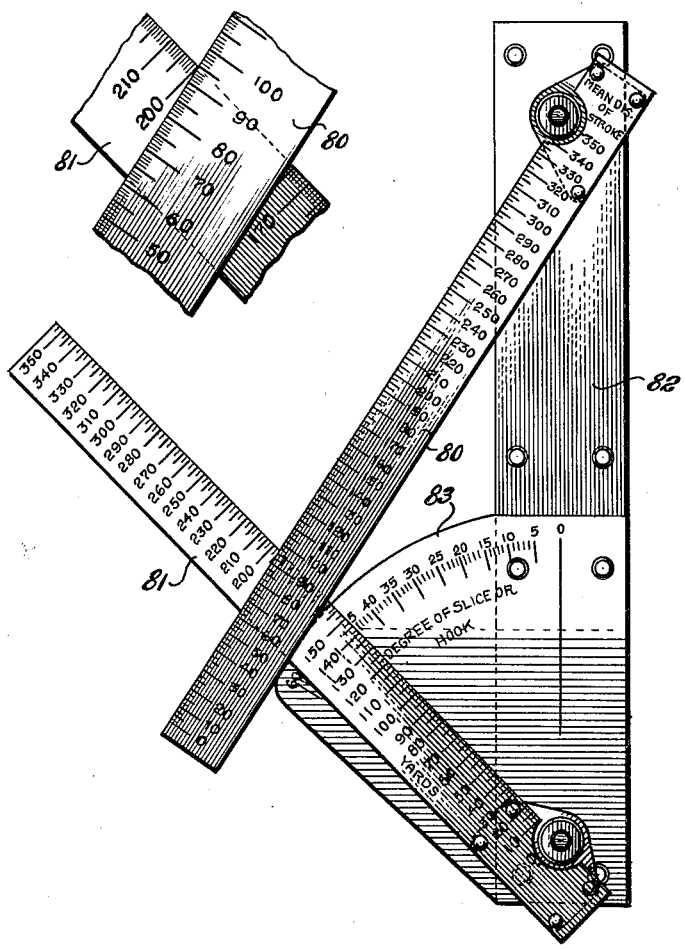
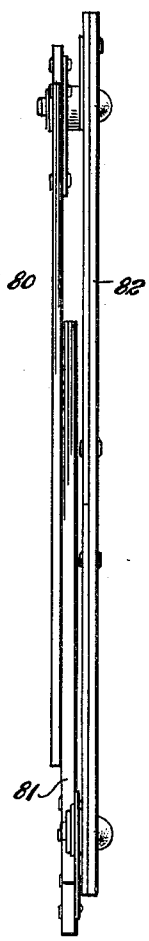

Patented Sept. 12, 1950

2,521,776

UNITED STATES PATENT OFFICE 2,521,776

GOLF PRACTICE APPARATUS

Thomas J. Butler, Harrison, N. J.

Application October 16, 1946, Serial No. 703,584

8 Claims. (Cl. 73—379)

This invention relates to apparatus for practicing golf ball driving strokes, which may also be utilized in playing a game simulating the game of golf in so far as the latter involves ball driving strokes.

The invention has for an object to provide a novel apparatus adapted to be operated by use of a golf ball driving club, the user taking the same stance and exercising the same swing of the club as would be taken and exercised when actually playing a game of golf over a golf course; the apparatus being adapted, when so operated, to indicate distance of flight of a golf ball which would be attained by a given club stroke impacting the same, as well as the angular direction of such flight and degree of hook or slice imparted, if any, either to the right or left as the case may be.

The invention has for another object to provide, in apparatus of the kind mentioned, a novel golf ball simulating element in combination with novel means for operatively relating the same to the distance and angle indicating means of the apparatus, together with novel means for setting and supporting said ball simulating element in position subject to reception of the impact of a playing club as swung by user making a playing stroke therewith.

The invention has for a further object to provide, for use in conjunction with the distance and angle indicating means of the apparatus, means for quickly and easily calculating the effective distance of approach to the cup attained by a given stroke of a swung club when accompanied by a hook or slice imparted thereby.

Further objects and novel features of this invention will more fully appear from the following detailed description of the invention.

Illustrative embodiments of this invention are shown in the accompanying drawings, in which:

Fig. 1 is a plan view of the golf practice apparatus as set ready for play; Fig. 2 is a side elevational view of the same; Fig. 3 is an end elevational view of the same; Fig. 4 is a transverse vertical sectional view, taken on line 4—4 in Fig. 2; Fig. 5 is a fragmentary horizontal sectional view, taken on line 5—5 in Fig. 2; and Fig. 6 is a fragmentary vertical sectional view, taken on line 6—6 in Fig. 5; Fig. 7 is a fragmentary vertical sectional view taken on line 7—7 in Fig. 1; Fig. 7A is a view similar to that of Fig. 7, but showing the detent plate released; Fig. 8 is a fragmentary vertical sectional view, taken on line 8—8 in Fig. 1; Fig. 9 is a fragmentary horizontal sectional view, taken on line 9—9 in Fig. 8.

Fig. 10 is a plan view of the golf practice device after play; Fig. 11 is a transverse vertical sectional view, taken on line 11—11 in Fig. 10; Fig. 12 is a fragmentary horizontal sectional view, taken on line 12—12 in Fig. 11.

Figs. 13 to 17 inclusive are various detail views of the spindle structure and worm wheel which form parts of the ball flight distance indicator means of the apparatus; and Fig. 18 is an enlarged fragmentary sectional view, similar to that of Fig. 11, but showing in more detail the speed control means of said flight distance indicator.

Fig. 19 is a detail horizontal sectional view of the golf ball simulating element of the apparatus, taken on line 19—19 in Fig. 8; and Figs. 20 to 25 inclusive are various detail views of said golf ball simulating element, Figs. 23, 24 and 25 thereof showing the manner of manipulating said element for detachably assembling the same in operative connection with the apparatus.

Fig. 26 is a fragmentary plan view of the apparatus as mounted and countersunk in a pit provided therefor at a practice green; Fig. 27 is a side elevational view thereof; Fig. 28 is a transverse vertical sectional view, taken on line 28—28 in Fig. 27; and Fig. 29 is a plan view of a cover member for the ball flight indicator transmission.

Fig. 30 is a plan view of a scaled device for calculating the effective distance of approach to the cup attained by a given club stroke when accompanied by hook or slice; Fig. 31 is a fragmentary face view of one of the scale members showing a preferred form of scale graduations thereof; Fig. 32 is a plan view, Fig. 33 a side edge view, and Fig. 34 an end view of the scaled device as positioned in use; and Fig. 35 is a fragmentary face view of intersecting scale members thereof in operated relation.

Fig. 36 is a diagram of a ball flight indicated by the apparatus, calculation of the resultant effective approach to the cup of which can be calculated by said scaled device.

Fig. 37 is an exemplification of a score card showing stroke attainments of two players when using the apparatus for a competitive game purpose.

Similar characters of reference are employed in the above described views, to indicate corresponding parts.

Referring to the drawings, the novel golf practice apparatus of this invention comprises a base 1 having a standard 2 disposed to extend upwardly from the rearward portion thereof. Said standard 2 terminates at its upper end in a horizontal head 3. Extending forwardly from said head 3 is a downwardly inclined bracket portion 4 which terminates in a socket piece 5 having an endwise open socket opening 6 which extends perpendicularly therethrough. Extending upwardly from the forward part of said base 1 is a vertical pivot post 7, the upper end of which is entered in the socket opening 6.

Journaled by its hub portion 8 upon said pivot post 7 is an offset forwardly extending carrier arm 9, which is adapted to swing in horizontal plane about said pivot post 7 as a pivoting axis. Preferably, a tubular bushing 10 is interposed between said pivot post 7 and the carrier arm hub portion 8. Said bushing is of greater height than the pivot post 7, so that the upper end portion of the bushing projects beyond the upper extremity of the pivot post, thus providing a chamber 11 above the latter which is adapted to serve as a reservoir for lubricating oil. Leading from the chamber 11, downwardly and obliquely through the upper end portion of the pivot post 7 and a contiguous part of the bushing 10, is a lubricating oil feed passage 12, which terminates at the bearing wall of the hub portion 8, whereby to deliver lubricating oil to and between the meeting surfaces of said hub portion and bushing. A body 13 of saturatable fibrous material is preferably inserted in the chamber 11 for holding and gradually giving up the lubricating oil (see Fig. 6). The lower end of said hub portion 8 is cut away to form a notch which terminates at its respective ends in stop shoulders 14. Said stop shoulders are adapted to cooperate with a fixed stop pin 15 which projects from the base 1, whereby to limit swinging movements of the carrier arm 9 respectively to the right or left of a normal initial central position.

The forward end portion of the base 1 terminates in an arcuate portion 16 having an inclined or beveled face upon which is mounted a scale plate 17. Said scale plate is graduated in angular degrees to the right and left from a zero mark which is coincident to the normal initial central position of the pivoted carrier arm 9; said graduations being calibrated to read up to sixty degrees from zero both to the right and left. Suitably affixed to the hub portion 8 of the carrier arm 9 is an indicating pointer 18 adapted to cooperate with the graduated scale plate 17.

The carrier arm 9 terminates at its free end in a chambered housing 19 which is suitably formed to provide bearing supports 20 and 21 for rotatably mounting the drive shaft 22 of the ball flight distance indicator of the apparatus. Said drive shaft 22, as thus supported, is so disposed that its axis is transverse to the longitudinal axis of the carrier arm 9. The outer end portion of said drive shaft 22 projects exteriorly from the housing 19 at the carrier arm side of the latter, and affixed to said exteriorly projecting end of the drive shaft, to project right angularly therefrom is a crank-arm 23. Said crank-arm terminates at its outer free end in an attachment hook 24, with which the ball simulating element of the apparatus may be operatively but detachably engaged, in the manner and for purposes hereinafter more fully described. Said crank-arm 23, with the ball simulating element attached thereto, is substantially counterbalanced by an oppositely extending rear end portion 23' of the crank-arm which is disposed to extend from the opposite side of said drive shaft 22, and upon which rear end portion or extension 23' is adjustably mounted a counterbalance weight 25.

Journaled in a suitable bearing means 26, with which the bottom of the housing 19 is provided, so as to extend upwardly through the housing, and to project exteriorly beyond the top cover 27 of the latter, is a rotatable spindle 28. Fixed on said spindle 28, within the interior of the housing, is a worm-wheel 29. Suitably connected with the inner end of the drive shaft 22, so as to be rotated thereby, is a worm 30 which meshes with and drives said worm-wheel 29, whereby to rotate said spindle 28. Mounted on the upper, exteriorly projecting end of the spindle 28, in frictionally clutched relation thereto, whereby to be rotated by the spindle and yet free to be manually rotated relative thereto when necessity requires, is a scaled indicator dial 31. Said indicator dial 31 is of circular shape, and the marginal part of its upper face is graduated to provide a scale indicative of ball flight distance in yards; said scale being preferably calibrated to indicate one hundred yards per complete revolution of the indicator dial 31.

One illustrative means for effecting the frictionally clutched attachment of the indicator dial 31 to the spindle 28, as shown, comprises a compression spring 32 which is mounted around the spindle below the dial, and which is adapted to thrust upwardly against a lower clutch plate or washer 33 which abuts and frictionally engages the underside of said dial. An upper clutch plate or washer 34 is engaged over the spindle to abut and frictionally engage the upper side of the dial. Said upper clutch plate or washer is unyieldingly held in such relation to the dial by a cotter pin or key 35, which is removably attached to the spindle 28 by engagement in an annular receiving groove 36 with which the outer end portion of said spindle 28 is provided.

As shown more particularly in Figs. 13 to 17 inclusive, means is provided for maintaining lubrication of the spindle 28 and its worm gearing, so that the same, and the dial 31 operated thereby, may turn freely with a minimum of frictional resistance. To this end, the spindle 28 is provided with an axial duct 37 which descends therethrough from its upper end, and which terminates in a radial outlet portion 38 which is located above the level of the worm wheel 29. Seated upon the upper face of said worm-wheel 29 is a reservoir disc 39 of saturatable material, such e. g. as felt. A keeper washer 40 is imposed on said disc 39 beneath the footing end of the above mentioned compression spring 32, whereby the latter also functions to hold said disc 39 in contact with the worm-wheel 29. The worm-wheel 29 is also provided with a duct 41 which descends through the hub thereof so as to discharge adjacent the lower portion of the spindle 28. A suitable lubricating oil is filled into the spindle duct 37 to discharge thence upon and so as to saturate the reservoir disc 39, and thus charge the same with an oil content. The oil will seep from the reservoir disc 39, and thence spread out over the marginal surface of the worm-wheel 29, whereby to reach and lubricate the teeth of the latter, and, consequently, the worm 30, which meshes therewith. Some oil will also seep from the reservoir disc 39 to descend through the duct 41 of the worm-wheel, so as to discharge therefrom upon and then descend the surfaces of the spindle 28 to the supporting bearing 26, whereby to lubricate these parts. In this manner the spindle and its driving gearing is kept in well lubricated free moving condition. The drive shaft 22 and its bearings 20—21 may be lubricated through suitable lubricant admission means 42 in any well known manner.

Suitably affixed upon the head 3 of the standard 2, by means of bolts 43' or other suitable fastening means, is a rearwardly projecting or offset body 43. This body 43 serves as an initial landing or contacting surface over which a swung club may move as it approaches the ball simulating element hereinafter described.

Hingedly mounted in connection with the standard head 3, for forward projection therefrom and above the downwardly inclined bracket portion 4 thereof, and so as to swing through a vertical arc or plane, is a detent plate 44. One illustrative means adapted to hingedly support said detent plate, as shown, comprises the provision of perforate hinge ears 45 which are formed by forwardly projecting free end portions of bars 46 which are respectively secured to the sides of the body 43. Affixed to the rearward end portion of said detent plate 44 is a yoke, the angular perforate ends of which provide hinge knuckles 47. Engaged through the hinge ears 45 and knuckles 47 is a transverse hinge pin 48. Mounted around said hinge pin 48 is a torsion spring 49, one arm 50 of which is stopped against the head bracket portion 4, and the other arm 51 of which engages the underside of the detent plate 44 so as to yieldably exert an upswinging thrust thereupon. Said detent plate is preferably formed to taper laterally toward its free end, and said free end is indented by a central V-shaped notch 52, the purpose of which will presently appear. Suitably affixed upon the inclined bracket portion 4 of the standard head 3 is a shock-absorbing buffer block 53 made of a suitable resilient material, such e. g. as soft rubber. When said detent plate 44 is released subject to up-swinging movement under the thrust of the torsion spring 49, such up-swinging movement will be arrested and limited, with a minimum of shock, by impingement of the rear end of said detent plate upon said buffer block (see Fig. 7A).

Detachably connected by the attachment hook 24 to the crank-arm 23 of the ball flight distance indicating means, is a ball simulating element 54. Said ball simulating element comprises a semispherical body of rubber or other material which is characterized by a suitable degree of resiliency. Secured to said ball simulating element 54, to project from the flat underside thereof, is a metallic U-shaped coupling or eye 55, the legs of which enter the body of said element, and are preferably firmly and securely anchored thereto by a metallic anchor plate 56 which is molded into said body to lie transversely therein, and to which anchor plate the legs of said coupling link or eye 55 are rigidly attached. To connect the ball simulating element 54 to the aforesaid crank-arm 23, the attachment hook 24 of the latter is engaged through the coupling link or eye 55 of said element. As shown more particularly by Figs. 20 to 25 inclusive, means is provided for preventing accidental escape of the ball simulating element 54 from its operative coupled engagement with the crank-arm hook 24. To this end, the gap 57 between the shank of said hook 24 and its bill 58 is sized to be of less width than the normal transverse diameter of a leg portion of the coupling link or eye 55, and one of said leg portions is indented to provide a laterally reduced or narrowed portion 59, which is dimensioned to easily pass through said gap 57 of the crank-arm hook. To effect coupled attachment of the ball simulating element 54 to the crank-arm hook 24, the former is turned to dispose its coupling link or eye substantially right angularly to the axis of the crank-arm 23, whereupon the narrowed portion 59 of a leg part of the coupling link or eye is brought into alignment with the hook gap 57 and pushed inwardly therethrough (see Fig. 23), whereafter the ball simulating element is rotated to displace said narrowed portion 59 relative to the hook gap 57 (see Fig. 24), and then said ball simulating element is upswung to normal longitudinally aligned extension from said crank-arm 23, in which position a full width portion of the coupling link or eye is opposed to the lesser width of said hook gap (see Fig. 25), and consequently accidental escape of the ball simulating element from the embrace of said hook 24 is prevented.

Engaged on the shank of the crank-arm hook 24, so as to frictionally bind thereon, and yet adapted to be longitudinally slid thereon toward the hook end thereof, is means which is operative to retain the ball simulating element 54 in upstanding longitudinal extension from the crank-arm 23, said means being at the same time subject to be engaged by the detent plate 44, when the latter is depressed, whereby said detent plate 44 will operate to releasably hold said crank-arm 23 and the ball simulating element disposed in what may be said to be a teed position, ready to receive the impact of a golf club as swung by a user of the apparatus. This means comprises a check member having a sleeve-like body 60 which is provided, at the side thereof toward the detent plate 44, with a laterally projecting check-nosing 61 which is adapted to overhang and engage the free end of the detent plate 44, when the latter is depressed. Said check member is preferably made of rubber so that, by its elastic constriction, it will frictionally bind itself to the shank of the crank-arm hook, when moved to a given position thereon. Said check member 60 is adapted to be slid upwardly upon the shank of said crank-arm hook 24, so as to abut and frictionally engage the end of the coupling link or eye 55 of the ball simulating element 54, whereby, at proper times, to hold said element against pivoting on said hook 24, and thus against accidental displacement from desired upstanding longitudinal extension from the end of the crank-arm 23 (see Figs. 2 and 8).

Preparatory to use of the apparatus, the ball simulating element 54 is set in position to receive impact of a golf club, when the latter is swung by the user, and also the ball flight and angle of flight indicating means are disposed at normal initial zero setting. To this end, the detent plate 44 is swung down against the tension of its spring 49 to horizontal forwardly projecting position, whereupon the crank-arm 23 is up-swung to upstanding position so as to engage in the notch 52 of said detent plate (see Fig. 9), and so that the free end of said detent plate 44 is engaged beneath the check-nosing 61 of the check member 60 (see Figs. 2 and 8). The engagement of the crank-arm 23 in the notch 52 of the detent plate 44 assures that the carrier-arm 9 has been properly positioned so that its indicator pointer 18 registers on the mid zero mark of the scale 17, thus effecting a normal initial setting of the angle of ball flight indicating means. The ball simulating element 54 is now upturned into axially aligned extension from the crank-arm 23, and is maintained in such erect position by sliding the resilient check member 60 upwardly on the crank-arm 23, so that the upper end of the check member exerts an upthrusting pressure upon the coupling link or eye 55, whereby to frictionally bind the same relative to the hook 24, thereby to hold the ball simulating element against accidental displacement from such normal initial erect and consequently teed position. When the apparatus is thus arranged in normal initial set condition, ready for use or play, the dial 31 is revolved about the spindle 28 until its zero mark registers with a fixed or stationary mark 62 which is inscribed or otherwise affixed to the housing cover 27, thus setting the ball flight indicating means ready for operation.

The apparatus having been thus made ready for use, the user takes stance in position to swing his club in the direction of the arrow X (see Fig. 2), toward the teed ball simulating element 54, and thereupon swings his club to impart a driving impact to the ball simulating element. Upon contact of the swung club with the ball simulating element, the latter will start forward so as to displace the check-nosing 61 from its restraining hold upon the detent plate 44, so that the latter, under the urge of its spring 49, immediately flies upward out of the path of revolving movement of the ball simulating element. When struck the ball simulating element will revolve counterclockwise as viewed in Fig. 2, and will thus revolve the crank-arm 23, to in turn revolve the drive shaft 22, and thus transmit rotative movement to the dial 31.

The force of the club impact upon the ball simulating element 54 will determine the duration of the period of revolution thereof, and consequently the amount of rotative movement imparted to the dial 31. Since each complete revolution of said dial 31 indicates a ball flight of one-hundred yards, the number of dial revolutions is counted; and such number plus any additional partial revolution will indicate the flight distance which would be attained by a normal golf ball, if struck by a club impact of corresponding force. For example, one revolution of the dial 31 plus a partial revolution terminated at the forty-six yard indicating graduation of said dial would indicate a ball flight of one-hundred and forty-six yards.

If the contact of the swung club with the ball simulating element 54 is such as to produce a slicing or hooking impact to either the right or left, contact of such character will cause the carrier arm 9 to swerve or swing to the right or left, as the case may be, and the amount of such swing and resultant angular diversion of ball flight from a straight line of flight toward the objective or cup will be indicated by the pointer 18 upon the scale plate 17.

While the drive shaft 22 is adapted to run free, under the spinning impulse imparted thereto by the revolving ball simulating element as induced by a swung club impact, it is desirable to provide means for controlling the spinning motion so that response thereof to the revolution of the ball simulating element and the resultant dial rotation will substantially accurately conform the ball flight indicating movement of said dial so as to attain an indicated result corresponding to that of an actual ball flight attained by a club impact of corresponding force. To this end, an adjustable brake means is provided for cooperation with the drive shaft 22. Said brake means comprises a suitable casing 63 which is affixed to the housing 19, to communicate with the interior of the latter at a point adjacent to the drive shaft 22. Threaded into the outer end of said casing 63 is an adjusting screw 64, upon which is footed a compression spring 65. Said compression spring 65 thrusts against a brake element 66, whereby to engage the latter with the peripheral surface of said drive shaft 22. The thrusting force of said spring 65 may be increased or decreased, as occasion may require, by manipulating the adjusting screw 64, whereby to increase or decrease the braking pressure of the brake element 66 against the drive shaft 22. For example, in warm or summer weather, when lubricating oil tends to thin, the braking pressure of the brake element would be increased somewhat, whereas in cold or winter weather, when lubricating oil tends to thicken, such braking pressure would be relaxed and decreased in compensation for retarding effect of the thickened oil on the movement of the drive shaft and associated dial transmission mechanism.

It will be understood that the apparatus may be used either indoors or out of doors. In the latter case, it may and preferably would be installed on a practice green or ground. When installed at a practice green or ground, it is preferable to provide a receiving pit in which the same may be lodged, so that the apparatus may be countersunk therein to such depth that all thereof but the set ball simulating element 54 and the teeing check member 60 lies below the surrounding ground level. This is shown in Figs. 26 to 28 inclusive; wherein the reference character 67 indicates the pit, which may e. g. be suitably formed by a concrete structure.

In said Figures 26 to 29 inclusive is also shown a modified form and arrangement of removable cover member 27' for closing the housing 19; said cover member being provided with a transverse fastening strap 68 having yieldable gripper tongues 69 to straddle the sides of the housing 19, so as to engage in cooperating receiving sockets 70 with which the side walls of the housing are provided.

To better instruct the user of the apparatus as to the effective or mean distance of approach to the assumed cup or objective which is attained by a given stroke of a swung club, if the impact of the club is such as to produce a slice or hook adapted to angularly divert the ball flight from a straight course toward said assumed cup or objective, I have provided a cooperative instrumentality for quickly and easily calculating the net distance gained toward the assumed cup or objective by any given indicated yardage distance of flight at an angular diversion from a straight course. This means is shown in Figs. 30 to 35 inclusive of the drawings, and comprises a pair of cooperative scale bars 80 and 81, each graduated along the lengths thereof to indicate distance in yards. Said scale bars are respectively pivotally mounted on a relatively stationary supporting base 82, one at one end thereof and the other at the opposite end thereof; so that, when respectively outswung laterally from a normal initial parallel relation, the scale bar 80 may be caused to angularly overlap the scale bar 81, so that their respective scales may intersect. As shown, the scale bar 80, which is pivoted to the upper end of the base 82, indicates total yardage, in a direct line, from a teeing off point to the assumed cup or objective; its scale reading from its free end toward its pivoted end. The scale bar 81, which is pivoted to the lower end of the base 82, indicates distance of flight in yards of an impelled ball, its scale reading from its pivoted end toward its free end. Affixed to the base 82, so as to be cooperative with the scale bar 81, by movement of the latter thereover, is a quadrant plate 83, having a scale graduated to indicate angle of ball flight.

To exemplify the use of the above described mean gained distance indicating device, it will be assumed that the straight line distance from the teeing off point to the assumed cup or objective is 350 yards, and it will be further assumed that by use of the above described stroke practice apparatus, a given club stroke applied thereto has resulted in an indication that the distance of ball flight attained is 200 yards, but is accompanied by a slice or hook causing an angular diversion of such flight from a straight line to the extent of 45 degrees. To ascertain under these assumptions what has been the actual distance gained by the stroke toward the objective, the scale bar 81 of the indicating device is outswung over the quadrant plate 83 until its inner edge registers with the 45 degree graduation of the quadrant plate scale, thus denoting the angular diversion of the ball flight from true course. Holding the scale bar 81 in this position, the scale bar 80 is next outswung to overlap the scale bar 81, and is manipulated to cause its inner edge to intersect the scale of said scale bar 81 at the 200 yard indicating graduation of the latter, thus denoting gross distance of ball flight obtained by the stroke. By then reading the graduation of the scale of the scale bar 80 which registers with said 200 yard indicating graduation of the scale bar 81, the mean gained distance attained by the involved stroke toward the assumed cup or objective will be indicated, viz. 95 yards. The mean gained distance of 95 yards, when subtracted from the 350 yard distance from teeing off point to the assumed cup or objective, will show that 255 yards must still be gained to reach said cup or objective. The method of using the device, thus pursued, will be understood from an inspection of the diagram of Fig. 36. From the above it will be obvious that notwithstanding a drive of 200 yards was attained by the stroke, yet the actual gain in yardage approach to the assumed cup or objective has been much reduced, due to the hook or slice produced by the stroke. In this way the user may quickly and easily analyze his strokes and the results thereof, so that more effective correction of faults thereof can be striven for.

While the described apparatus is primarily adapted for stroke practice, said apparatus and the associated mean gained distance indicating device may also be employed by a plurality of users as a competitive game. In the latter case each player makes a club stroke in turn, and records any angle of hook or slice and gross ball flight yardage resulting therefrom, and then by use of the mean gained distance indicating device ascertaining the net or actual yardage gain toward the assumed cup or objective. These factors of the play are then scored for each player on a score card 85, such e. g. as shown in Fig. 37. Wherein the underscored notations in the hook or slice columns indicate degree of angular diversion of ball flight from a straight line, and the associated non-underscored notations in these columns indicating the gross yardage of ball flight, whereupon the mean or net distance gained is entered in the associated column. The total of the mean distances gained by each player, according to the number of turns or holes played, constituting the players final score. It will be noted, in the exemplifying score card 85 shown in Fig. 37, that although the player Jones attained the greatest gross total yardage by his drives, yet by reason of accompanying greater hook or slice effects, his net yardage gain was less than that of his competitor Smith, whose gross yardage average less, but, by reason of less slice or hook, his net yardage was greater, and consequently Smith wins the competition. From this it will be understood that a very interesting game is afforded while at the same time club stroke practice is attained.

I am aware that various changes may be made in the construction and details of the above described apparatus without departing from the scope of the invention as defined by the following claims. It is therefore intended that the constructions shown and described are to be interpreted as illustrative and not in a limiting sense.

I claim:

1. In a golf practice apparatus having a base structure and a carrier arm pivotally supported thereby for swinging movement in horizontal plane either to the right or left from a predetermined normal initial position thereof, a rotatable dial mechanism, for indicating ball flight distance, mounted on the carrier arm and including a drive shaft provided with a crank-arm, a ball simulating element connected with the end of said crank-arm, movable detent means mounted on the base structure to releasably hold the carrier arm against lateral displacement from its predetermined initial position and said crank-arm and ball simulating element erected in position to receive driving impact of a swung golf club, such impact being adapted to revolve the ball simulating element and crank-arm about the axis of said drive shaft so as to rotate said shaft and thus actuate said dial mechanism, check means carried on the crank-arm and adapted to engage the detent means to hold the same in operative position, and means to move the detent means to inoperative position when said check means is displaced therefrom by movement of the ball simulating element and crank-arm in response to golf club impact.

2. In a golf practice apparatus having a base structure and a carrier-arm pivotally supported thereby for swinging movement in horizontal plane either to the right or left from a predetermined normal initial position thereof, a rotatable dial mechanism, for indicating ball flight distance, mounted on said carrier-arm and including a drive shaft provided with a crank-arm, a ball simulating element connected with the end of said crank-arm, a spring actuated up-swinging detent plate pivotally connected with said base structure, said detent plate having a notched free end adapted, when said detent is depressed against the tension of its spring, to be engaged by the crank-arm, whereby to hold the latter and said ball simulating element in a normal initial upstanding position for reception of driving impact of a swung golf club, and at the same time to dispose said carrier-arm in predetermined normal initial position, and a check member on said crank-arm having a check-nosing to releasably engage and hold the detent plate depressed, impact of a swung golf club upon said ball simulating element being operative to withdraw said check-nosing from and thus release said detent plate and thereupon revolve said ball simulating element and crank-arm about the axis of said drive shaft so as to rotate the latter and thus actuate said dial mechanism.

3. In a golf practice apparatus having a base structure and a carrier-arm, pivotally supported thereby for swinging movement in horizontal plane either to the right or left from a predetermined normal initial position thereof, a rotatable dial mechanism, for indicating ball flight distance, mounted on said carrier-arm and including a drive shaft provided with a crank-arm, a ball simulating element connected with the end of said crank-arm, a spring actuated up-swinging detent plate pivotally connected with said base structure, said detent plate having a notched free end adapted, when said detent is depressed against the tension of its spring, to be engaged by the crank-arm, whereby to hold the latter and said ball simulating element in a normal initial upstanding position for reception of driving impact of a swung golf club, and at the same time to dispose said carrier arm in predetermined normal initial position, a check member on said crank-arm having a check-nosing to releasably engage and hold the detent plate depressed, impact of a swung golf club upon said ball simulating element being operative to withdraw said check-nosing from and thus release said detent plate and thereupon revolve said ball simulating element and crank-arm about the axis of said drive shaft so as to rotate the latter and thus actuate said dial mechanism, and adjustable means for counterbalancing said crank-arm and ball simulating element.

4. A golf practice apparatus as defined in claim 1 wherein the ball simulating element comprises a semi-spherical body having a coupling eye projecting from its flat underside, said crank-arm terminating in an attachment hook engageable by the coupling eye of said body, and means on said crank-arm movable toward the interengaged hook and coupling eye adapted to bind and hold said ball simulating element in axial extension from the crank-arm end.

5. A golf practice apparatus as defined in claim 5 wherein the ball simulating element comprises a semi-spherical body having a coupling eye projecting from its flat underside, said crank-arm terminating in an attachment hook engageable by the coupling eye of said body, and said check member being movable on said crank-arm toward the interengaged hook and coupling eye whereby to bind and hold said ball simulating element in axial extension from the crank-arm.

6. A golf practice apparatus as defined in claim 1 wherein the ball simulating element comprises a semi-spherical body having a coupling eye projecting from its flat underside, said crank-arm terminating in an attachment hook engageable by the coupling eye of said body, said coupling eye having at one side a portion of reduced cross-section of dimension somewhat less than the width of a gap between the bill and body of said hook whereby to admit said coupling eye into the bight of the hook, whereupon movement of the ball simulating element to normal axially extended relation to the crank-arm aligns a portion of the coupling eye of normal cross-section with said hook gap, thus preventing accidental displacement of the coupling eye from the hook.

7. A golf practice apparatus as defined in claim 1 wherein the ball simulating element comprises a semi-spherical body having a coupling eye projecting from its flat underside, said crank-arm terminating in an attachment hook engageable by the coupling eye of said body, said coupling eye having at one side a portion of reduced cross-section of dimension somewhat less than the width of a gap between the bill and body of said hook, whereby to admit said coupling eye into the bight of the hook, whereupon movement of the ball simulating element to normal axially extended relation to the crank-arm aligns a portion of the coupling eye of normal cross-section with said hook gap, thus preventing accidental displacement of the coupling eye from the hook, and means on said crank-arm movable toward the interengaged hook and coupling eye adapted to bind and hold said ball simulating element in said axial extension from the crank-arm.

8. A golf practice apparatus as defined in claim 5 wherein the ball simulating element comprises a semi-spherical body having a coupling eye projecting from its flat underside, said crank-arm terminating in an attachment hook engageable by the coupling eye of said body, said coupling eye having at one side a portion of reduced cross-section of dimension somewhat less than the width of a gap between the bill and body of said hook, whereby to admit said coupling eye into the bight of the hook, whereupon movement of the ball simulating element to normal axially extended relation to the crank-arm aligns a portion of the coupling eye of normal cross-section with said hook gap, thus preventing accidental displacement of the coupling eye from the hook, and said check member being movable on said crank-arm toward the interengaged hook and coupling eye whereby to bind and hold said ball simulating element in axial extension from the crank-arm.

THOMAS J. BUTLER.

REFERENCES CITED

The following references are of record in the file of this patent:

UNITED STATES PATENTS

| Number | Name | Date |
| --- | --- | --- |
| 717,381 | Fregoso | Dec. 30, 1902 |
| 791,848 | Wilson | June 6, 1905 |
| 888,660 | Sears et al. | May 26, 1908 |
| 1,591,985 | Levkowits | July 13, 1926 |
| 1,697,131 | Morrill | Jan. 1, 1929 |
| 1,804,040 | Tannehill | May 5, 1931 |
| 1,932,049 | Ryan | Oct. 24, 1933 |
| 1,976,405 | Le Witt | Oct. 9, 1934 |

FOREIGN PATENTS

| Number | Country | Date |
| --- | --- | --- |
| 276,812 | Great Britain | Sept. 8, 1927 |